United States Patent [19]
Jansson

[11] 3,911,626
[45] Oct. 14, 1975

[54] ROLLING FRICTION DRIVE DEVICE

[76] Inventor: Torgny Jansson, 17A Norevagen, Lindesburg, Sweden, S-711 00

[22] Filed: Oct. 18, 1973

[21] Appl. No.: 407,731

[52] U.S. Cl. ............... 134.5 R; 51/170 PT; 74/206; 74/209
[51] Int. Cl. .......................... B24b 5/00; F16h 13/00
[58] Field of Search ...... 74/207, 209, 206; 408/124, 408/126; 51/134.5 R, 170 R, 170 PT

[56] References Cited
UNITED STATES PATENTS

| | | | |
|---|---|---|---|
| 1,253,795 | 1/1918 | Diehl | 74/207 |
| 1,492,879 | 5/1924 | Evhardt | 74/207 |
| 2,092,714 | 9/1937 | Flygare | 74/207 |
| 2,514,857 | 7/1950 | Gottbreht | 74/207 |

*Primary Examiner*—Samuel Scott
*Assistant Examiner*—Allan R. Burke
*Attorney, Agent, or Firm*—Elliott I. Pollock

[57] ABSTRACT

A motor driven hand drilling apparatus acts as the power source for a tool, such as a grindstone, and drives the tool through a coupling device operative to rotate the tool at a lower speed than the drill. The grindstone is mounted on a shaft rotatably supported on a frame, and a friction disc is also attached to the shaft. A bracket is swingably attached to the frame and includes one leg having a fastening device for removably attaching the chuck of the hand drill thereto, and a second leg having a bearing in alignment with the chuck. A drive shaft is supported between said chuck and bearing with the outer surface of the drive shaft being in direct engagement with the periphery of the friction disc at a position between the chuck and bearing.

3 Claims, 3 Drawing Figures

ROLLING FRICTION DRIVE DEVICE

The present invention relates to a drive unit for a rotating tool, such as a grindstone mounted on a shaft, friction disc also being mounted on the shaft, on the periphery of which a motor-operated drive shaft freely bears, the drive shaft being pivotal along an arc towards and from the friction disc, and said drive shaft being increasingly turned and pressed against the friction disc with increasing loads on the operated tool.

Grindstones have been driven in different ways from the time of the original crank and treading devices to more modern constructions employing an electric motor and more or less expensive gear mechanisms, whose gear ratios must be relatively large to effect the low speed required by a grindstone. The gear mechanisms can be tooth wheels, usually a worm gear, a V-belt or a friction roll against a drive gear or directly against the grindstone. Known constructions are relatively expensive.

There is a known construction where a portable electric drill of a certain manufacture is used as the source of driving power. The drilling machine is provided with a small drive roll of rubber, which drives a large drive disc, which is attached to the same shaft as the grindstone. The drilling machine is attached in a pipe with a stop screw. Contact pressure between the drive roll and drive disc is obtained by arranging the attaching means of the drilling machine so that it is pivotal around a hinge and by causing the drilling machine to be pressed against the drive disc by means of a wing nut. A gear ratio of about 1:10 is obtained by such a construction. What restricts the gear reduction is that a certain minimum diameter of the rubber drive roll is necessary for resistance reasons. Therefore, the drilling machines must be provided with a reduction gear of their own so that the speed will be about 900 revolutions per min. The force capable of pressing the tool against the stone during a grinding without the drive roll slipping, will be restricted even if the wing nut operation is properly tightened. The construction creates a rotating bending moment on the drive roll and the chuck with its bearing, which is detrimental.

By means of the present invention it is possible to drive with a motor, e.g. an electric hand drilling machine, a grindstone or the like without the risk of slipping and in a simple and reliable way. The invention has great advantages over the previously known constructions described above. It has for instance a larger gear ratio, a long life, absolutely slip-free operation and avoids detrimental rotating bending moment on the drive roll and the bearing of the drive shaft in the motor.

The invention can be used as a reducing device for different purposes, e.g. where roll friction gears, gear reduction sets, worm gears and V-belt reductions are now used. It is especially suitable at large gear ratios.

An advantageous embodiment of the invention is shown in the enclosed drawing.

Figure 2:
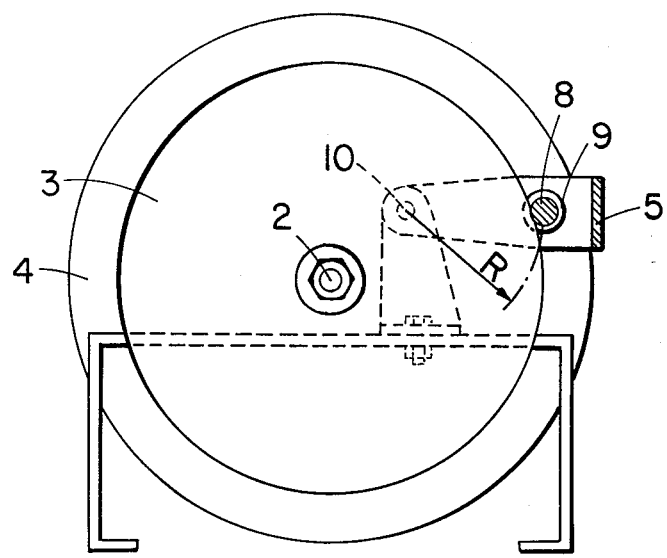
FIG. 2 shows a section of the device taken on line A—A of FIG. 1.
Figure 3:
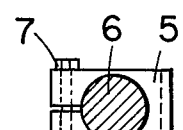
FIG. 3 shows a section taken on line B—B of FIG. 1.
Figure 1:
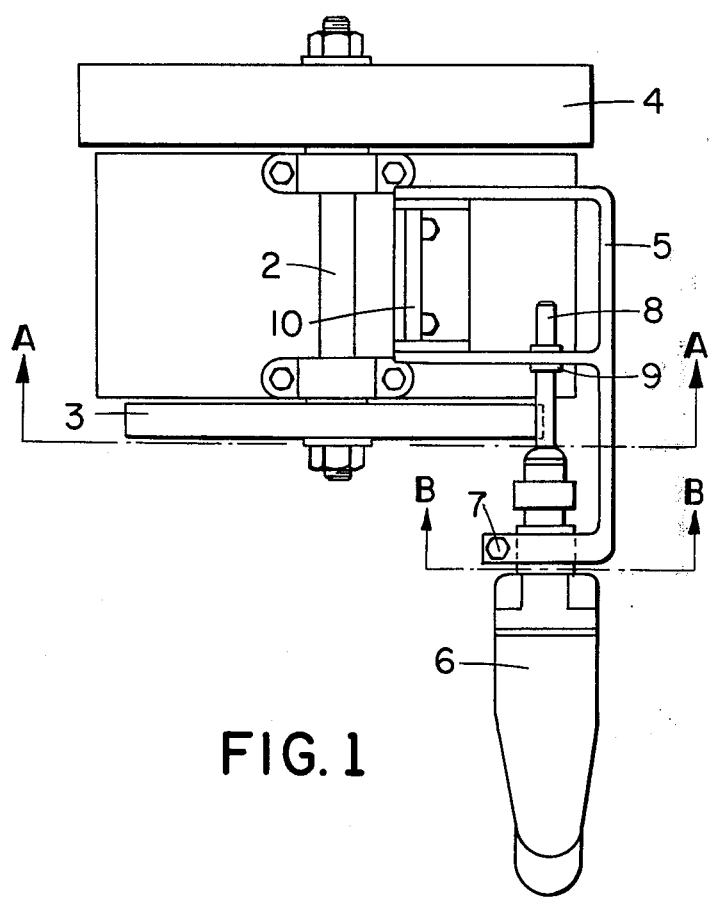
FIG. 1 shows a device constructed in accordance with the present invention and associated with a grindstone as seen from above.

As is apparent from FIG. 1 the grindstone 4 is mounted on one end of a shaft 2. On the other end of the same shaft a friction disc 3 is mounted. The periphery of the disc 3 is of rubber. The outer metal surface of a steel drive shaft 8 bears directly on this rubber periphery. The drive shaft 8 rolls clockwise on the periphery of the friction disc 3 and drives the disc. The shaft 8 is secured at one end in the chuck of a hand drilling machine 6 and its other end is mounted in a support bearing 9 provided in a leg of a clamp 5. The clamp 5 is pivotal around a shaft 10 so that the drive shaft 8 can move along a radius R under the influence of gravity. With increasing load on the friction disc 3, the drive shaft 8 tends to travel downwards along the periphery of the disc. The drive shaft is however forced to move along the radius R. The result will be that the drive shaft 8 is pressed more against the friction disc 3 the more the disc is loaded. An automatic adaption of the contact pressure according to the transferred moment is thus obtained. The hand drilling machine 6 is attached to another leg of the clamp 5, with the chuck of the drilling machine aligned with bearing 9, by means of an attaching device, for instance a screw 7 (see FIG. 3).

Although an illustrative design of the invention has been described and shown on the drawing it is evident that the invention must not be considered as restricted to this, but it comprises also each variation or modification falling within the scope of the appended claims. Instead of a portable drilling machine any suitable motor can be used.

What is claimed is:

1. In combination, a hand drilling machine, a tool, and a device for coupling said tool to said drilling machine to cause said machine to rotate said tool at a relatively low speed compared to the speed of the drilling machine, said coupling device including a frame, a shaft rotatably supported by the frame, said tool being affixed to one end of said shaft for rotation therewith, a circular friction disc of relatively large diameter affixed to the other end of said shaft for rotating the shaft and tool, a bracket having a first leg provided with means for mounting said hand drilling machine thereon, said bracket including a second leg spaced from said first leg and provided with a bearing, said first and second legs being disposed in facing relation to opposing sides of said friction disc respectively, said bearing being aligned with the center of the chuck of the drilling machine in its mounted position, a relatively small diameter smooth surfaced driving shaft having one end mounted in said bearing, the other end of said driving shaft being fastened in the chuck of said drilling machine, said bracket being swingably supported from said frame so that gravity forces said driving shaft towards the periphery of the friction disc to cause the outer surface of said driving shaft to directly contact the periphery of said disc at a position between the bearing and the chuck, the direction of rotation of the drilling machine being such that the torque of said driving shaft further presses said driving shaft against the periphery of the friction disc.

2. The combination of claim 1 wherein the driving shaft is fabricated of steel and the periphery of the friction disc is fabricated of rubber.

3. The combination of claim 1 wherein said tool is a grindstone.

* * * * *